Dec. 25, 1962　　　　　R. BOYER　　　　3,070,058
PROCESS OF MANUFACTURE FOR MASTER CYLINDER FILLER CAPS
Filed April 1, 1957　　　　　　　　　　2 Sheets-Sheet 1

INVENTOR.
RAYMOND BOYER
BY John A. Young
ATTORNEY

Dec. 25, 1962   R. BOYER   3,070,058
PROCESS OF MANUFACTURE FOR MASTER CYLINDER FILLER CAPS
Filed April 1, 1957   2 Sheets-Sheet 2
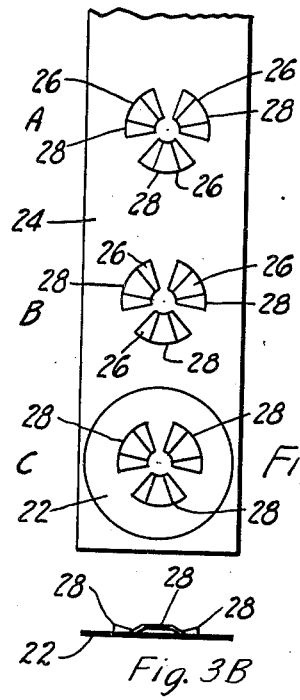
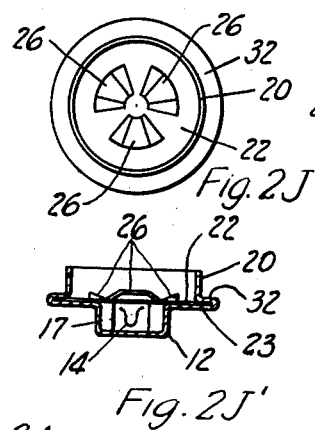
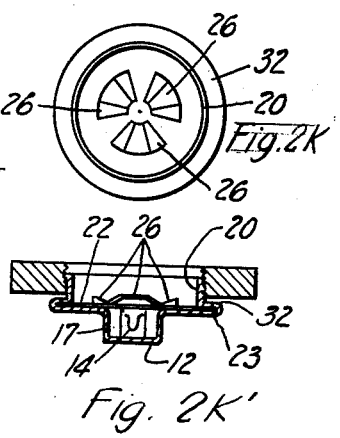
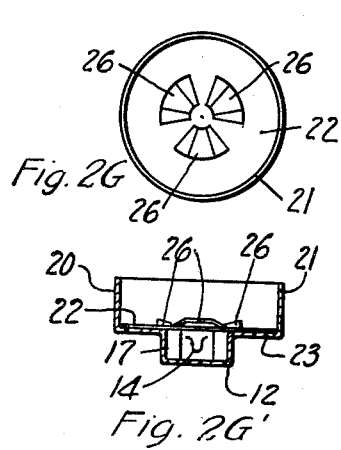
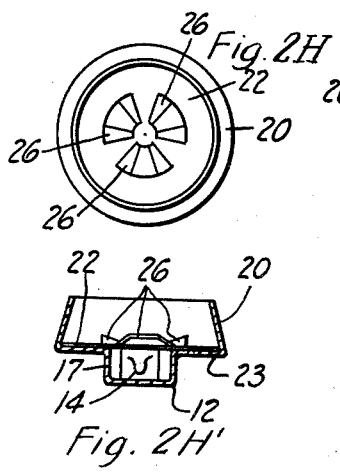
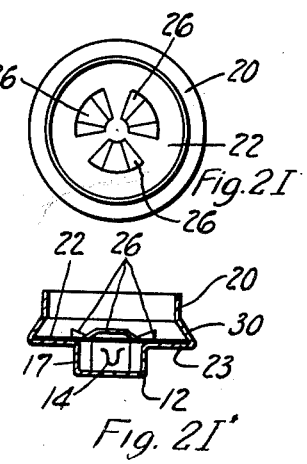
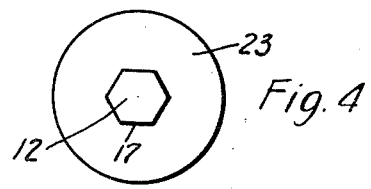
INVENTOR.
RAYMOND BOYER
BY John A. Young
ATTORNEY United States Patent Office 3,070,058
Patented Dec. 25, 1962

3,070,058
PROCESS OF MANUFACTURE FOR MASTER
CYLINDER FILLER CAPS
Raymond Boyer, South Bend, Ind., assignor to The Bendix Corporation, a corporation of Delaware
Filed Apr. 1, 1957, Ser. No. 649,822
5 Claims. (Cl. 113—121)

This invention is directed to the process of manufacture of master cylinder filler caps and the construction of said filler caps.

One of the purposes of the invention is to contrive a continuous process for manufacturing a filler cap including progressive stamping, blanking and crimping steps, to ultimately form the master cylinder filler cap out of sheet metal stock.

One of the features of the invention is that the filler cap is constructed of two components, both of which are manufacturable concurrently, and their separate manufacture is coordinated so that the two components are combined at the appropriate time and are thereafter processed together to form the finished product.

An object of the invention is to provide a structurally simplified filler cap which lends itself to a high-production-quantity technique of manufacture.

An over-all object of the invention is to obtain a master cylinder filler cap which will satisfactorily function in confining fluid in the reservoir of a master cylinder and will prevent the ingress of foreign matter, such as dirt and water, while permitting an inflow of air to vent the reservoir chamber of the master cylinder.

Other objects and features of the invention will become apparent from a consideration of the following description, which proceeds with reference to the accompanying drawings, wherein:

FIGURES 1A–1F show the progressive steps wherein a boss having irregularly formed sides is drawn out of sheet metal stock, the stock then being blanked and formed into the cup component of the filler cap;

FIGURES 1A'–1F' are section views of 1A–1F respectively;

FIGURES 2G–2K show in progressive steps the baffle element of the filler cap being combined with the cup in timed relation with the location of the cup so that it falls into the cup as indicated, and the steps thereafter for forming the complete article;

FIGURES 2G'–2K' are section views of 2G–2K, respectively;

FIGURE 3A shows the progressive steps of forming the baffle in timed relation with the cup formation so that it is blanked out and drops into the cup as indicated;

FIGURE 3B is a section view of FIGURE 3; and

FIGURE 4 is a top view of the finished cup.

Referring to FIGURES 1A–1F, the sheet metal stock 10 is advanced at intervals through stations of FIGURES 1A, 1B, 1C and 1D, during which time a boss 12 is drawn in the stock. At the station of FIGURE 1A a rounded punch (not shown) is used to begin drawing a rounded protuberance 11 which is changed successively at stations B and C to a straighter edge by tools having a flatter profile.

Figure 1A:
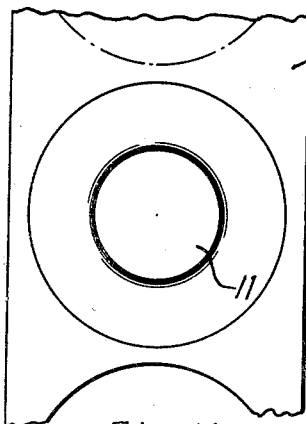
Figure 1B:
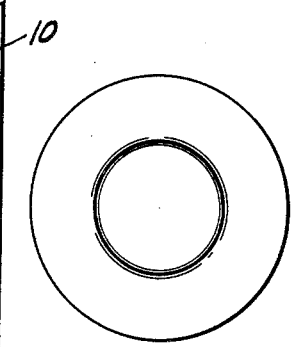
Figure 1C:
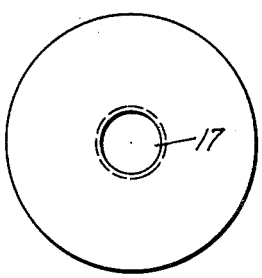
Figure 1A:
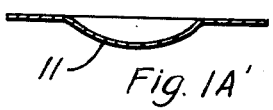
Figure 1B:
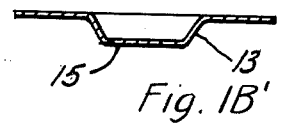
Figure 1C:
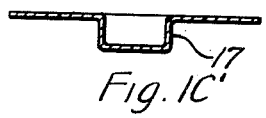

At the station of FIGURE 1B the rounded protuberance 11 becomes steeper at the wall 13 and the base 15 is formed to a flat configuration. At the station of FIGURE 1C the wall 17 is shaped cylindrically.

Figure 1D:
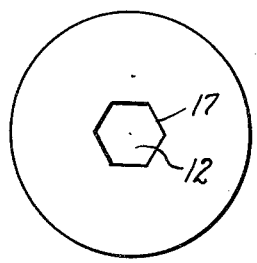

At the station of FIGURE 1D the cylindrical wall 17 is formed wtih "flats" and the boss 12 obtains its ultimate shape with flat, irregularly shaped sides forming a square, hexagon or the like, which is adapted for gripping by a suitable tool.

Figure 1E:
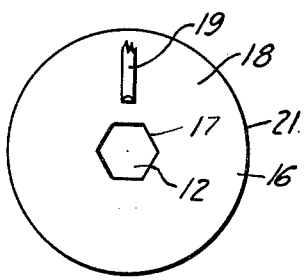

At the station of FIGURE 1E a piercing tool 19 lances an opening 14 in the boss. At the station of FIGURE 1E the segment which provides the cup portion is not as yet blanked from the stock 10 so that the boss is held by the sheet metal strip during the lancing operation. The piercing operation leaves a tongue which is bent within the boss and remains attached thereto. The segment 16 is then blanked from the sheet metal stock, and it consists of a circular disc 18 having the lanced boss 12 formed at the center thereof.

Figure 1F:
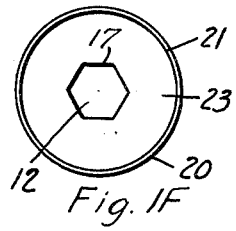
Figure 1D:
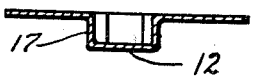
Figure 1E:
Figure 1F:
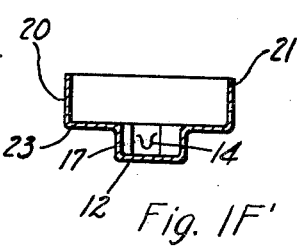

At the station of FIGURE 1F the outer periphery 21 of the disc is bent upwardly into a cylindrical form 20 which is perpendicular to the annular base 23. The resulting cup shaped article is now in condition for insertion of baffle 22 (FIGURE 3B) which is being formed simultaneously with the construction of the cup, but at a higher level.

A strip of sheet metal 24 is cross feeding at a higher level than the stock of sheet metal 10 used in the manufacture of the cup.

Referring to FIGURE 3A, at station A there is embossed in the sheet metal stock sectors 26 which are imprinted in the face of the stock 24. The depth of the indentation increases in a radially outward direction, and the outer edges 28 of the embossment are sheared away from the sheet metal stock in step B of FIGURE 3A. In step C of FIGURE 3A the embossed baffle is blanked from the sheet metal 24 in a circular form. Step C is located at a higher level than the stamped cup, and the blanking of the baffle 22 is performed in timed relation with the arrival of the cup at a lower level. When the walls 20 of the cup are cylindrically shaped, the baffle 22 (see FIGURE 2G) falls within the cylindrical wall 20 and lies flat against the annular base 23 of the cup with the embossments 26 turned up from the base of the cup. The cup and baffle are then processed together to form the completed article.

Referring to FIGURES 2G–2K, after insertion of the baffle 22 at the step of FIGURE 2G, the cylindrical walls 20 at the station of FIGURE 2H are formed into a frusto-conical shape. A crimp 30 is then formed at the station of FIGURE 2I in the tapered wall and from this crimp 30 at the station of FIGURE 2J a sharply defined shoulder 32 is next shaped to tightly clamp baffle 22 against the annular base 23 of the cup. It will be noted that this process of crimping shoulder 32 has the effect of foreshortening the cylindrical wall 20. The remainder of the cylindrical wall 20 is then threaded at the station of FIGURE 2K by a suitable rolling process and the article is then finished.

The purpose of the sheared embossments 26 is to permit the passage of air through the lanced opening 14 in the boss 12 and across the baffle 22. In this way, air is vented through the filler cap and into the master cylinder reservoir to compensate for removal of hydraulic fluid. The embossments 26 prevent loss of hydraulic fluid tending to splash upwardly against the filler cap. As a result, the master cylinder filler cap confines the hydraulic fluid within the reservoir of the master cylinder but permits an inflow of air which will prevent formation of a vacuum within the hydraulic cylinder reservoir as hydraulic fluid is removed.

The master cylinder construction forms no part of the present invention. The filler cap can be used with master cylinders of any desired shape or construction. U.S. Patent 2,683,352, issued July 13, 1954, shows a master cylinder which can be equipped with the filler cap constituting the present invention. The master cylinder filler cap can be used with a wide assortment of master cylinders, and the specific reference to one acceptable master cylinder is not to be considered as a restriction of the invention to any particular type of master cylinder.

It will be apparent to those skilled in the art that the principles of the invention which are disclosed herein are general in nature and are not to be interpreted as restricted to the specific example embodiment which is merely illustrative of the invention. It is intended that revisions and variations of the invention which are reasonably to be expected from those skilled in the art, and which incorporate the herein disclosed principles, will lie within the scope of the following claims.

I claim:

1. A continuous process for manufacturing master cylinder filler caps comprising the steps of: providing a continuous sheet of intermittently moving stock metal, progressively forming a boss while simultaneously forming discontinuous cuts which outline a segment of the sheet, lancing an opening in the boss to form a ventilation port therein, blanking said segment in circular form from the sheet metal stock, drawing the periphery of the segment into a cylindrical wall extending upwardly from the base having said boss therein, forming a flat second circular stamping conforming approximately to the base of the other stamping, impressing a plurality of embossments in said second stamping which are lanced to form openings in said second stamping, blanking said second stamping from the associated stock in timed relation with the location of said first stamping so that the second stamping drops past the cylindrical wall and lies flat to be assembled with the base of the first stamping, forcing radially inward a portion of the cylindrical wall to clamp said second stamping between the base and the resulting crimped portion, and threading the remaining cylindrical portion of the first stamping.

2. A process for manufacturing filler caps comprising the steps of: drawing a boss at spaced intervals along the length of an intermittently traveling sheet metal stock, blanking a circular segment having said boss at the center thereof from said stock, shaping a cylindrical wall from the sides of the circular base, forming a flat second circular stamping from a second sheet of stock having embossed indentations therein which are partially sheared from said stamping, blanking said circular stamping in timed relation to the location of the first stamping whereby the second stamping falls past the cylindrical wall and lies flatly against the base thereof to be assembled therewith, forcing a margin of the cylindrical wall adjacent the base radially inward to lock the circular stamping against said base, and then threading said cylindrical wall.

3. The process of claim 2 in which the cylinder wall is shaped into a frusto-conical form preliminary to the clamping operation.

4. The process of claim 2 in which the threads are formed in the cylindrical segment by a rolling operation.

5. A process for manufacturing filler caps comprising the steps of: drawing a boss in sheet metal stock, blanking a circular segment stamping from said stock with said boss at the center thereof, shaping an annular segment of said circular segment into a cylindrical segment extending transversely of the circular segment, blanking a second stamping having embossments therein which are partially sheared therefrom, the blanking of said second stamping being performed in timed relation to the location of the first stamping whereby the second stamping is simultaneously blanked and dropped within the second stamping to fall within the cylindrical segment and lie flatly against the circular base of the first stamping, forcing a circular portion of said cylinder adjacent said circular segment radially inwardly to lock the second stamping against said base, and threading a portion of the cylindrical segment of the first stamping.

References Cited in the file of this patent

UNITED STATES PATENTS

| | | |
|---|---|---|
| 730,739 | Bucklin | June 9, 1903 |
| 908,319 | Osswald | Dec. 29, 1908 |
| 1,051,269 | Roys | Jan. 21, 1913 |
| 1,099,873 | Bowen | June 9, 1914 |
| 1,707,891 | Allison | Apr. 2, 1929 |
| 1,734,566 | Drumm | Nov. 5, 1929 |
| 1,768,294 | Reid | June 24, 1930 |
| 1,990,718 | Swanstrom | Feb. 12, 1935 |
| 2,186,519 | Buono | Jan. 9, 1940 |
| 2,260,899 | Heftler | Oct. 28, 1941 |
| 2,296,550 | Williams | Sept. 22, 1942 |
| 2,321,155 | Ponpitch | June 8, 1943 |
| 2,460,721 | Thompson | Feb. 1, 1949 |
| 2,728,316 | Oberg et al. | Dec. 27, 1955 |
| 2,789,524 | Cranford et al. | Apr. 23, 1957 |
| 2,972,321 | Lyon | Feb. 21, 1961 |